Jan. 16, 1962     F. JÄCKEL     3,016,756
V-BELTS
Filed March 5, 1958
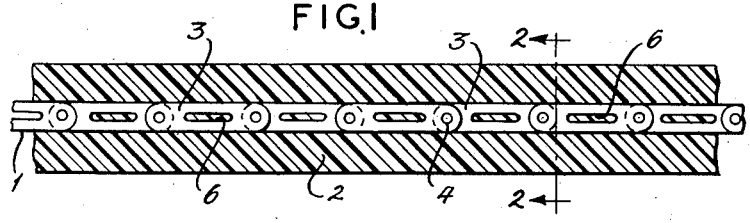
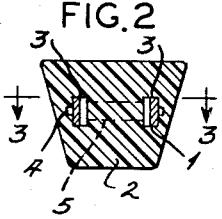
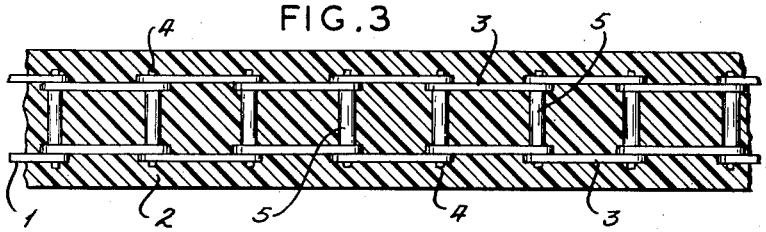
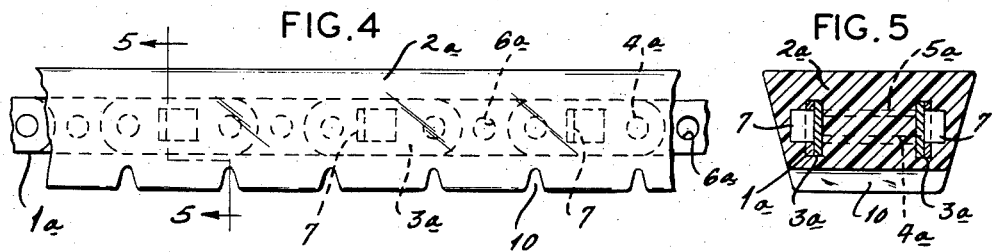
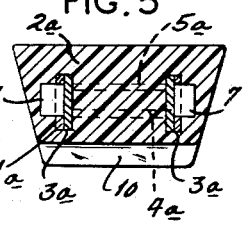
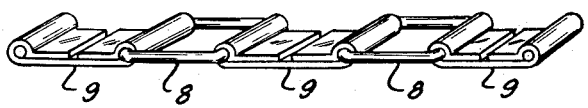
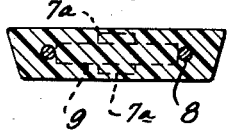
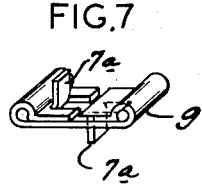
INVENTOR:
Fritz Jäckel
BY
ATTORNEY United States Patent Office 3,016,756
Patented Jan. 16, 1962

3,016,756
V-BELTS
Fritz Jäckel, Bielefeld, Germany, assignor, by mesne assignments, to Mobay Chemical Company, Pittsburgh, Pa., a corporation of Delaware
Filed Mar. 5, 1958, Ser. No. 719,349
Claims priority, application Germany Mar. 9, 1957
1 Claim. (Cl. 74—234)

This invention relates generally to reinforced belts and, more particularly, to a novel V-belt having a metal reinforcing core.

The conventional V-belt or other flat belt used for driving machine parts is usually formed from leather. This leather belt may be provided with a core of fabric or wire to increase the strength of the belt. It has been proposed to manufacture belts of this type from natural or synthetic rubber and to provide a reinforicng core of either metal or fabric, but such belts are not entirely satisfactory because it is very difficult to bond the rubber to the core. The rubber must be securely bound to the core because the rubber begins to crumble when it becomes detached from the core and, consequently, the belt soon fails. Usually, the textile fiber core is bound to the rubber by means of an adhesive while the rubber may be bound to the metal by various means, but none of these means are entirely sucessful in providing a permanent bond.

It is an object of this invention to provide an improved metal reinforced V-shaped belt. Another object of the invention is to provide a V-belt having improved longitudinal strength and adapted to withstand high lateral forces. A still further object of the invention is to provide a permanently lubricated plastic belt having a metal core.

Other objects will become apparent from the following description with reference to the accompanying drawing, in which:

FIGURE 1 is a longitudinal sectional view of one embodiment of this invention;

FIGURE 2 is a cross section along the lines II—II of FIGURE 1;

FIGURE 3 is a longitudinal sectional view along the line III—III of FIGURE 2;

FIGURE 4 is a side view of an embodiment of the invention which differs somewhat from that shown in FIGURES 1 through 3;

FIGURE 5 is a cross section along the line IV—IV of FIGURE 4;

FIGURE 6 is a perspective view of a suitable core for an embodiment of this invention;

FIGURE 7 is a perspective view of one link of the core of FIGURE 6; and

FIGURE 8 is a cross section through a belt provided with the core of FIGURES 6 and 7.

Generally speaking, the foregoing objects and others are accomplished in accordance with this invention by providing a belt having a V-shaped cross section and a link chain core enclosed in a substantially non-porous rubber-like polyurethane plastic. It has been found that a belt having a link chain core separated by a substantially non-porous rubber-like polyurethane plastic having the physical characteristics specified hereinafter has a longitudinal strength at least equal to that of the heretofore available leather or rubber belts and that such a belt is capable of withstanding much higher lateral force than the heretofore available belts. It would be impossible to provide a natural or synthetic rubber belt with a link chain core because no method is available for securely bonding the rubber to the chain links. The belt provided by this invention, however, has a chain core securely bound to the polyurethane covering and has a very high tensile strength and a very high abrasion resistance which prevents damage to the sides of the belt as it is used on a pulley. The belt also has a very high lateral strength because links of the chain are connected together by means of pins inserted in a bushing which withstands extreme lateral forces.

In a preferred embodiment of the invention having a core with extremely strong joints, the polyurethane coating contains molybdenum disulfide and a suitable silicone oil. A suitable hydrocarbon may also be included in the polyurethane to further improve the strength. The presence of the molybdenum disulfide, silicone oil and hydrocarbon in the polyurethane improves the movability of the polyurethane in the neighborhood of the joints of the chain core, permitting the belt to be bent without separating the polyurethane cover from the core. That is, because of the presence of molybdenum disulfide, silicone oil and a hydrocarbon, the polyurethane will not separate anywhere from the chain and not even where the forces are greatest due to the severity of a bend in the chain. This sealed-in lubrication may also be achieved by soaking the chain in a non-aging lubricant, for instance, a silicone oil, before the chain is embedded in the polyurethane. If this is done, it is, of course, unnecessary to include the molybdenum disulfide and silicone oil in the polyurethane formulation. The lubricant cannot escape from the joint in the chain because the chain is completely sealed within the polyurethane covering.

In order to achieve complete locking in place of the polyurethane, one embodiment of the invention provides for the core to be formed from sheet metal chain links having protrusions and cutouts which assist in binding the polyurethane to the chain. Lateral notches may be provided on the upper and lower surface of the belt to permit bending to form belts having a small diameter.

In order to provide a belt having the most advantageous characteristics, the width of the base of the belt should be at least four times the height. A belt of this type is particularly advantageous for use with variable speed drives with adjustable width pulleys because flat surfaced belts result in better speed variation possibilities than any other type of belts.

Although the invention is primarily directed to improved V-shaped belts, it is to be understood that belts having a flat or other shape may be formed to advantage with a polyurethane and a chain core.

Any suitable substantially non-porous rubber-like polyurethane may be used to provide the covering about the chain core. Examples of suitable polyurethanes are disclosed in U.S. Patents 2,729,618, 2,620,516, 2,621,166 and 2,764,565. In order to produce the best results, the polyurethane should have an elongation of from about 300 to about 700%, a tensile strength of from about 200 kg./cm.$^2$ to about 350 kg./cm.$^2$, and a Shore A hardness of from about 55° to about 85°. Belts formed from polyurethanes having these physical characteristics are thus preferred. The polyurethane may be secured around the core by casting or by a lamination process in which strips of the polyurethane are secured to the chain. It is preferred, however, to cast the polyurethane about the chain. Any suitable organic compound having reactive hydrogens disclosed in the aforesaid patents, including a polyester prepared by esterification of a dicarboxylic acid and a polyhydric alcohol and a polyalkylene ether glycol prepared by condensation of an alkylene oxide, may be reacted with any suitable organic polyisocyanate and cross-linking agent to form the polyurethane. The polyurethane may be formed in accordance with those examples in the aforesaid patents which produce substantially non-porous rubber-like polyurethanes having the required physical characteristics. Inasmuch as the invention is not concerned with the preparation of a particular polyurethane, a further discussion of the chemistry is not required.

Referring now to the drawing, a link chain core 1 embedded in a polyurethane covering 2 is illustrated in FIGURES 1 through 3. In preparing the V-shaped belt of these figures of the drawing, a suitable polyurethane prepared by reacting a polyester with an organic polyisocyanate and a glycol is cast about the chain 1 in a suitable mold. Conventional casting methods, such as the one disclosed in U.S. 2,729,618, may be used. In an alternate procedure, the polyurethane may be placed around the chain by compressing strips of the polyurethane thereabout until the strips become welded together and bound to the core. Link chain 1 is composed of individual linking plates 3, pins 4 and bushings 5. All of these parts can be manufactured from sheet metal although, in some embodiments, it is desirable to form bushings 5 from a substantially rigid non-porous polyurethane. The embodiment of FIGURE 1 is provided with cutouts 6 in side strips 3. These cutouts 6 become filled with polyurethane when it is cast about the chain, thereby improving the bond between the polyurethane cover and the link chain core.

The embodiment shown in FIGURES 4 and 5 has a link chain core somewhat similar to that of the embodiment of FIGURES 1 through 3 with the exception that the side strips of the core of this embodiment are much wider than those of the other embodiment. This results in protrusions projecting on each side of the chain link, as shown in FIGURE 5. These projections become embedded in the polyurethane coating and insure that the core will be secured to the coating.

A particularly advantageous flat link chain is shown in FIGURES 6, 7 and 8. This chain is made up of alternate rectangular wire brackets 8 and flat sheet metal links 9 bent over the ends of the rectangular bracket 8. Protrusions can be formed by cutting the sheet metal top and bottom of link 9 and bending the resulting tab 7a upwardly or downwardly as shown in FIGURE 7. These tabs become embedded in the polyurethane and increase the strength of the resulting belt against longitudinal stresses. A link chain of this type is especially well suited for making V-belts having a width which is greater than four times its height. The resulting belt is extremely rigid in a lateral direction, but it is sufficiently pliable longitudinally for the preparation of belts which have very small diameters.

Preferably, a non-aging lubricant is applied at least in the neighborhood of each joint of each of the links in the chain cores used in the foregoing embodiments before the chain is embedded in the polyurethane by soaking the core in the lubricant or the polyurethane used for forming the cover contains molybdenum disulfide, a silicone oil and a hydrocarbon.

The belt may be provided with notches 10 on one surface or on both surfaces to facilitate bending of the belt to form small loops.

Any suitable silicone oil having a viscosity of from about 50 to about 500 centistokes at 20° C. may be used. Examples of suitable silicone oils include dimethyl siloxane polymers having a viscosity of 50 centistokes at 20° C., dimethyl siloxane polymers having a viscosity of 140 centistokes at 20° C. and dimethyl siloxane polymers having a viscosity of 440 centistokes at 20° C.

Any inert hydrocarbon, such as, for example, high boiling petroleum fractions, including kerosene, conventional lubricating oils, paraffin waxes and other waxes, such as, for example, Montan wax, Ceresin wax, and the like may be used.

The total amount of silicone oil and hydrocarbon present should preferably be from about 0.01 percent to about 5 percent by weight, based on the weight of the cured rubberlike polyurethane, although greater amounts may be used without seriously affecting the properties of the belt. Silicone oil alone or a mixture containing silicone oil and hydrocarbon in any ratio may be used.

The particles of molybdenum disulfide should preferably be present in an amount of from about 0.01 percent to about 5 percent and, most preferably, in an amount of from about 0.1 percent to about 1 percent by weight, based on the weight of the cured rubber-like polyurethane. The molybdenum disulfide may be in any suitable physical form, but it is preferred to use molybdenum disulfide powder having a particle size within the range of from about 0.002 to about 2 millimeters in cross section and, most preferably, within the range of from about 0.002 to about 0.02 millimeters in cross section.

It is advantageous to use chemically pure molybdenum disulfide. The molybdenum disulfide may be added to the reaction mixture which produces the polyurethane plastic at any time. U.S. Patents 2,367,946 and 2,686,156 disclose suitable methods for preparing molybdenum disulfide. The molybdenum disulfide and silicone oil sweat out of the polyurethane as the belt is used providing a thin film of lubricant at the joint of the core.

Although the invention has been described in the foregoing for the purpose of illustration, it is to be understood that such detail is solely for this purpose and that variations can be made therein by those skilled in the art without departing from the spirit and scope of the invention except as is set forth in the claim.

What is claimed is:

A belt having a substantially V-shaped cross section comprising a link chain reinforcement, said links securely hinged one with another about a transverse axis and enclosed by a substantially non-porous polyurethane body portion, said body portion securely bonded to said link chain, said polyurethane body portion containing molybdenum disulfide, silicone oil and a hydrocarbon.

References Cited in the file of this patent

UNITED STATES PATENTS

| | | |
|---|---|---|
| 297,650 | Warner | Apr. 29, 1884 |
| 2,367,946 | Kaercher | Jan. 23, 1945 |
| 2,576,372 | Toulmin et al. | Nov. 27, 1951 |
| 2,609,081 | Hapman | Sept. 2, 1952 |
| 2,686,156 | Arntzen et al. | Aug. 10, 1954 |
| 2,752,638 | Anspon | July 3, 1956 |
| 2,805,182 | Hallenbeck | Sept. 3, 1957 |
| 2,951,053 | Reuter et al. | Aug. 30, 1960 |

FOREIGN PATENTS

| | | |
|---|---|---|
| 21,888 | Great Britain | of 1894 |
| 174,883 | Great Britain | Feb. 9, 1922 |

OTHER REFERENCES

"Modern Plastics," April 1954, pages 143, 144, 146, 228 and 229, Plastics Technical Section: "Polyurethane Resins" by Johna Bjorksten, Henry Tovey, and Henry L. Dollard, Jr.